United States Patent [19]

Arai et al.

[11] Patent Number: 5,751,937
[45] Date of Patent: *May 12, 1998

[54] ARRAY TYPE STORAGE UNIT SYSTEM

[75] Inventors: Kouji Arai, Odawara; Takao Satoh; Akira Yamamoto, both of Sagamihara, all of Japan

[73] Assignee: Hitachi, Ltd., Tokyo, Japan

[*] Notice: The term of this patent shall not extend beyond the expiration date of Pat. No. 5,564,116.

[21] Appl. No.: 670,019

[22] Filed: Jun. 25, 1996

Related U.S. Application Data

[63] Continuation of Ser. No. 341,082, Nov. 17, 1994, Pat. No. 5,564,116.

[30] Foreign Application Priority Data

Nov. 19, 1993 [JP] Japan .................................. 5-290538

[51] Int. Cl.$^6$ .................................................. G06F 11/00
[52] U.S. Cl. ................................... 395/182.05; 711/114
[58] Field of Search ........................ 395/182.04, 182.05, 395/182.07, 182.03, 441; 321/51.1, 40.4; 711/114, 113

[56] References Cited

U.S. PATENT DOCUMENTS

| | | | |
|---|---|---|---|
| 5,237,658 | 8/1993 | Walker et al. | 371/10.2 |
| 5,331,646 | 7/1994 | Krueger et al. | 371/40.4 |
| 5,337,322 | 8/1994 | Wang et al. | 371/51.1 |
| 5,357,509 | 10/1994 | Ohizumi | 371/10.1 |
| 5,390,187 | 2/1995 | Stallmo | 371/10.1 |
| 5,390,327 | 2/1995 | Lubbers et al. | 371/40.1 |
| 5,459,853 | 10/1995 | Best et al. | 395/182.04 |
| 5,463,765 | 10/1995 | Kakuta et al. | 395/182.04 |
| 5,564,116 | 10/1996 | Arai et al. | 395/182.05 |

OTHER PUBLICATIONS

D. Patterson et al., "A Case for Redundant Arrays of Inexpensive Disks (RAID)", ACM SIGMOD Conference Proceedings, 1988, pp. 109–116.

Menon et al, "Methods for Improved Update Performance of Disk Arrays", IEEE, System Sciences, 1992, Ann. Hawii Int'l Conf., pp. 74–83.

Reddy et al, "Gracefully Degradable Disk Arrays", IEEE, Fault–Tolerant Computing, 1991, Int'l Symposium, pp. 401–408.

*Primary Examiner*—Robert W. Beausoliel, Jr.
*Assistant Examiner*—Joseph E. Palys
*Attorney, Agent, or Firm*—Fay, Sharpe, Beall, Fagan, Minnich & McKee

[57] ABSTRACT

A storage unit system includes a control apparatus having a unit for reading memory data from a plurality of storage units before increase into a memory of the control apparatus, a preparing unit for preparing parity data newly from the memory data read in the memory, a rearrangement unit for dispersing transfer data from a processor read in the memory and the newly prepared parity data to be written into a plurality of storage units after the increase to perform arrangement of data, a memory unit for storing a write position on the way of the rearrangement of data, a comparison unit for comparing an access position for an access request from the processor with the write position, and a determining unit for determining a data dispersed pattern used in a data access from the processor on the basis of a comparison result of the comparison means, whereby the storage unit can be increased individually with a unit of one storage unit and dynamically without stop of the system.

4 Claims, 6 Drawing Sheets

ARRAY TYPE STORAGE UNIT SYSTEM

This is a continuation application of U.S. Ser. No. 08/341,082, filed Nov. 17, 1994, now U.S. Pat. No. 5,564,116.

BACKGROUND OF THE INVENTION

The present invention relates to an array type storage unit system constituting an external storage unit system of a computer system in which collected data such as a file are dispersed to be stored in a plurality of storage units, and more particularly to an array type storage unit system in which increase of the storage units for the purpose of improvement of the data transfer speed, increase of a storage capacity or increase of redundancy is performed dynamically without stop of the system.

Heretofore, as an array type storage unit system, a disk array system is known.

The disk array system is to attain a high-speed data transfer between a control processor and an external storage apparatus by performing input/output operation of a large number of magnetic disk units in parallel in a computer system.

A configuration of the disk array system is described in, for example, a paper of D. Paterson, G. Gibson and R. Katz, "A Case for Redundant Arrays of Inexpensive Disks (RAID)", ACM SIGMOD Conference Proceedings, 1988, pp. 109–116.

The paper proposes a disk array configuration named RAID (Redundant Array of Inexpensive Disks).

The RAID disperses normal input/output data to be stored in a plurality of drives and stores parity data therein.

The parity data is set in order to restore or reconstitute missing data by using the parity data together with a data reconstitution function when the data is lost.

Drives in the disk array system are not increased with a unit of one drive and are increased with a unit of a plurality of drives in which data are dispersed.

In this system, the increased storage area can be treated as a lump of continuous area, so that the mapping information of addresses is merely rewritten and movement of data is not required, to thereby facilitate the adding operation after increase of the storage unit.

That is, the increased storage unit can be added behind the maximum address of the memory area.

In the above paper, however, it seems that increase of drives for changing a width of dispersed data for increase with a unit of one drive and particularly dynamic increase without stop of the system are not described.

As described above while taking the disk array system as an example, the conventional array type storage unit system increases the storage units with a unit of a plurality of storage units in which data are dispersed.

Accordingly, a unit of increased storage units is made larger and it seems that a cost for increase of the storage capacity is increased.

Further, in the conventional array type storage unit system, when the storage units are increased, the number of storage units in which data are dispersed cannot be changed and accordingly there is a possibility that the number of the storage units which operate in parallel upon transfer of data cannot be increased.

Accordingly, there is a possibility that improvement of the data transfer speed due to addition or increase of the storage units cannot be effected.

Furthermore, in the conventional array type storage unit system, in order to increase the storage units with a unit of a plurality of storage units in which data are dispersed, the effect due to the increased redundancy of the storage unit system cannot be expected by only change of mapping of addresses even when new drives are added to the storage units in which data are already stored.

SUMMARY OF THE INVENTION

It is an object of the present invention to provide a technique capable of increasing storage units individually with a unit of one storage unit in an array type storage unit system in which data are dispersed to be stored in a plurality of storage units and further capable of realizing the increase of the storage unit dynamically without stop of the system.

The above and other objects and novel features of the present invention will be apparent from description of the specification and the accompanying drawings.

In order to achieve the above object, the first apparatus of the present invention comprises a plurality of storage units and a control apparatus including a device for dispersing parity data and transfer data from a processor to be stored in the plurality of storage units, a device for reading necessary data from the plurality of storage units in response to a data read request from the processor to transfer the read data to the processor and a device for reconstituting inaccessible data by using parity data when the data in the storage unit cannot be accessed due to a failure, wherein the control apparatus comprises a reading device for reading a predetermined number of storage data from the plurality of storage units before increase of another storage unit into a memory of the control apparatus, a preparing device for preparing parity data newly from the predetermined number of storage data read in the memory of the control apparatus on the basis of a redundancy of the storage unit system, a rearrangement device for dispersing the transfer data from the processor read in the memory of the control apparatus and the newly prepared parity data to be written in the plurality of storage units after the increase including a storage unit increased newly under control of the control apparatus to perform rearrangement of data, a write position storing device for storing the write position on the way of the rearrangement of data, a device for comparing an access position of an access request from the processor with the write position, and a device for determining a data dispersed pattern used in the data access from the processor on the basis of a comparison result of the comparing device.

Further, according to a second apparatus of the present invention, in the first apparatus, the reading device of the control apparatus reads a predetermined number of storage data except parity data from the plurality of storage units before the increase into the memory of the control apparatus.

Furthermore, according to a third apparatus of the present invention, in the second apparatus, when the number of the storage units before the increase is n (n≧1), the redundancy of parity data stored in the storage units before the increase is r (n>r≧1) and the number of the storage units after the increase is (n+k) (k≧1), the reading device of the control apparatus reads (n+k−r) data except parity data from the n storage units before the increase into the memory of the control apparatus, and the preparing device of the control apparatus prepares r parity data newly from the (n+k−r) data read in the memory of the control apparatus in accordance with the redundancy of the storage unit system, the rearrangement device of the control apparatus dispersing the (n+k−r) data read in the memory of the control apparatus and the newly prepared r parity data to be written in the (n+k) storage units after the increase to perform the rearrangement of data.

In addition, according to a fourth apparatus of the present invention, in the second apparatus, when the number of the storage units before the increase is n (n≧1), the redundancy of parity data stored in the storage units before the increase is r (n>r≧1), the number of the storage units after the increase is (n+k) (k≧1) and the redundancy of parity data stored in the storage units after increase is (r+k), the reading device of the control apparatus reads (n−r) data except parity data from the n storage units before the increase into the memory of the control apparatus, and the preparing device of the control apparatus prepares (r+k) parity data newly from the (n−r) data read in the memory of the control apparatus in accordance with the redundancy of the storage unit system, the rearrangement device of the control apparatus writing the (n−r) data read in the memory of the control apparatus and the newly prepared (r+k) parity data into the (n+k) storage units after the increase to perform the rearrangement of data.

Further, according to a fifth apparatus of the present invention, in the second apparatus, when the number of the storage units before the increase is n (n≧1), the redundancy of parity data stored in the storage units before the increase is r (n>r≧1), the number of the storage units after the increase is (n+k) (k≧1) and the redundancy of parity data stored in the storage units after increase is (r+s), (0≦s≦k), the reading device of the control apparatus reads (n+k−(r+s)) data except parity data from the n storage units before the increase into the memory of the control apparatus, and the preparing device of the control apparatus prepares (r+s) parity data newly from the (n+k−(r+s)) data read in the memory of the control apparatus in accordance with the redundancy of the storage unit system, the rearrangement device of the control apparatus writing the (n+k−(r+s)) data read in the memory of the control apparatus and the newly prepared (r+s) parity data into the (n+k) storage units after the increase to perform the rearrangement of data.

Further, according to a sixth apparatus of the present invention, in the first apparatus, when the number of the storage units before the increase is n (n≧1), the redundancy of parity data stored in the storage units before the increase is r (n>r≧1) and the number of the storage units after the increase is (n+k) (k≧1), the reading device of the control apparatus reads (n+k) data from the n storage units before the increase into the memory of the control apparatus, and the preparing device of the control apparatus prepares r parity data newly from the (n+k−r) data except former parity data of the (n+k) data read in the memory of the control apparatus in accordance with the redundancy of the storage unit system, the rearrangement device of the control apparatus dispersing the (n+k−r) data except the former parity data of the (n+k) data read in the memory of the control apparatus and the newly prepared r parity data to be written into the (n+k) storage units after the increase to perform the rearrangement of data.

In the third apparatus, the data except the parity data are read in the memory, whereas in the sixth apparatus, after necessary data have been read in the memory, the parity data are removed.

According to the apparatus, in the array type storage unit system, the control apparatus reads out a predetermined number of storage data from the plurality of storage units before the increase into the memory of the control apparatus and the parity data is newly prepared from the predetermined number of storage data read in the memory of the control apparatus in accordance with the redundancy of the storage unit system. The transfer data from the processor read in the memory of the control apparatus and the newly prepared redundancy data are dispersed to be stored in the plurality of storage units after the increase to perform the rearrangement of data. Further, the write position on the way of the rearrangement of data is stored and the access position for the access request from the processor is compared with the write position on the way of the rearrangement of data to determine the data dispersed pattern used in the data access from the processor on the basis of the comparison result. Accordingly, the dynamic rearrangement of data can be attained. Consequently, the storage unit can be increased with a unit of one storage unit instead of increase with a unit of a plurality of storage units in which data are dispersed and a cost for the increase of the storage capacity can be reduced. Accordingly, improvement of the data transfer speed by the increase of the storage unit or increase of the redundancy by the increase of the storage unit can be attained.

DESCRIPTION OF THE PREFERRED EMBODIMENT

Referring now to the accompanying drawings, an embodiment of the present invention is described in detail.

The same reference numeral is given to an element having the same function throughout the drawings illustrating the embodiment and repeated description thereof is omitted.

Figure 1:
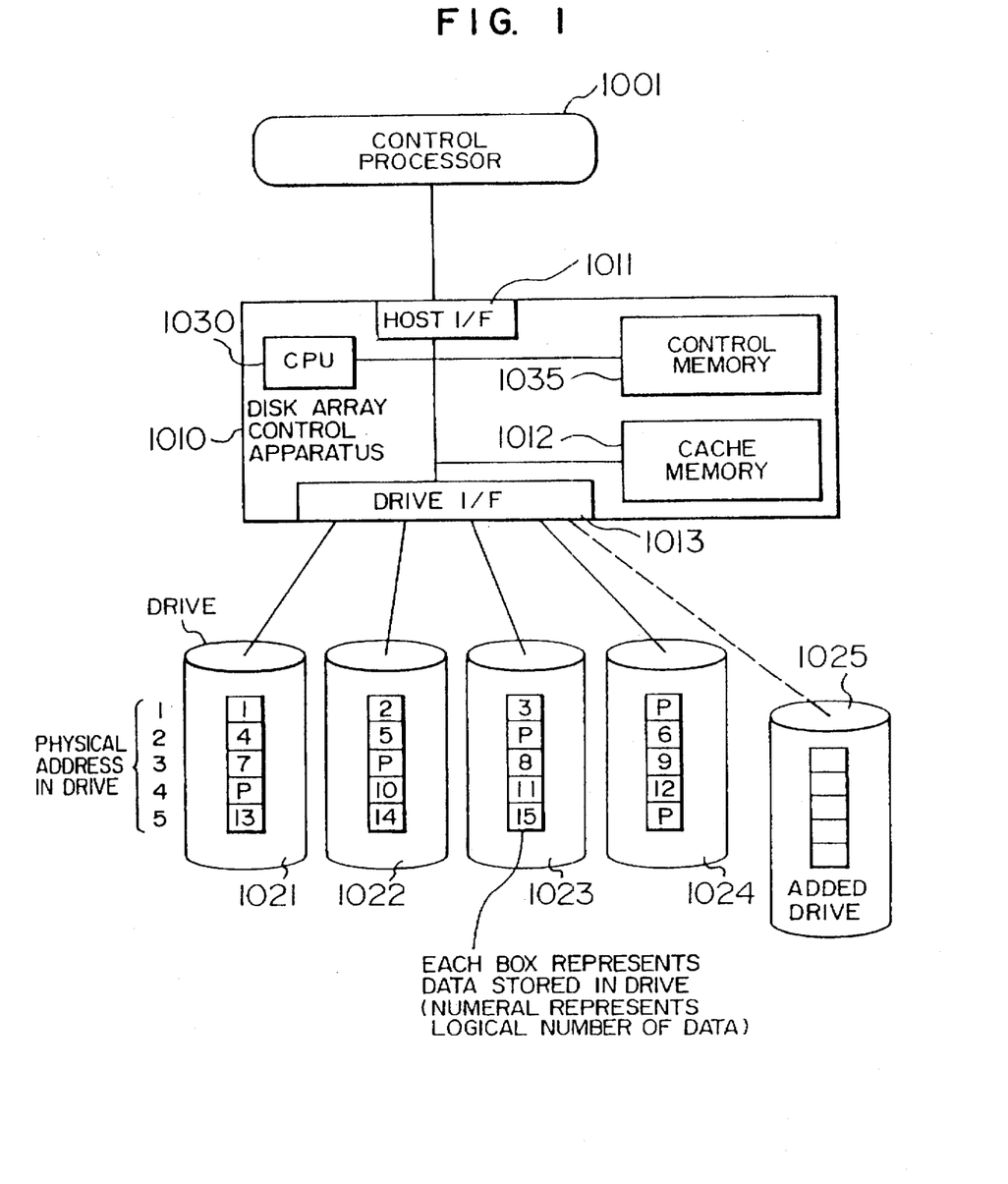
FIG. 1 is a block diagram schematically illustrating a storage unit system according to an embodiment of the present invention.

FIG. 1 is a block diagram schematically illustrating a storage unit system according to an embodiment of the present invention.

The storage unit system shown in FIG. 1 comprises a control processor 1001 including a CPU for issuing an input/output request, drive units 1021 to 1025 (the drive unit 1025 is a drive unit to be increased) for storing data, and a control apparatus (disk array control apparatus) 1010 of an array type storage unit system.

The disk array control apparatus 1010 includes a host interface (I/F) 1011, a cache memory 1012, a drive interface (I/F) 1013, a CPU 1030, and a control memory 1035.

The disk array control apparatus 1010 performs processing for an access request from the control processor 1001, input/output processing for the drive units 1021 to 1025, preparation of parity data and data reconstitution using the parity data.

A data dispersed pattern including the number of storage units in the storage unit system, the redundancy of the system, and information of an amount of data dispersed in one storage unit at a time is stored in the control memory 1035 of the disk array control apparatus 1010 in the form of table. The values set in the data dispersed pattern table are previously set by the user.

Data are first stored in the four drive units 1021 to 1024.

Data are dispersed in each of the drive units with a unit of block and one parity data block is provided for three blocks.

The parity data are generated from data of three blocks to be added with the parity data and has the redundancy capable of reconstituting the data of the three blocks even if data of any one of the blocks are lost.

In FIG. 1, the blocks of the parity data indicated by mark "P" are dispersed to be stored in the plurality of drive units 1021 to 1024 in order to avoid concentration of accesses to a particular drive unit.

Figure 2:
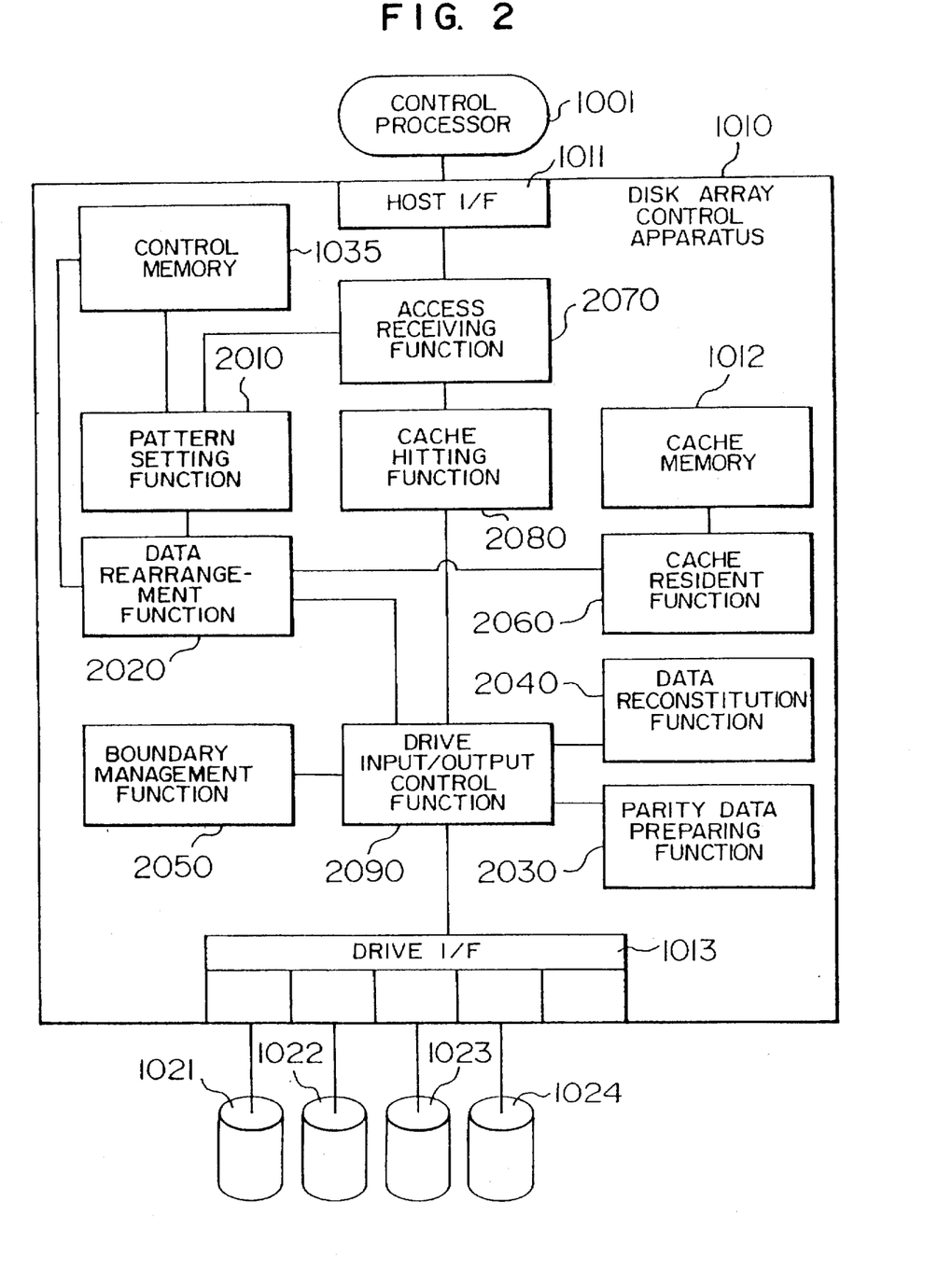
FIG. 2 is a functional block diagram schematically illustrating a disk array control apparatus in the embodiment.

FIG. 2 is a functional block diagram schematically illustrating the disk array control apparatus in the embodiment.

The disk array control apparatus 1010 shown in FIG. 2 comprises a data dispersed pattern setting function 2010, a data rearrangement function 2020, a parity data preparing function 2030, a data reconstitution function 2040, a data dispersed pattern boundary management function 2050, a cache resident function 2060, an access request receiving function 2070, a cache hitting function 2080, a drive input/output control function 2090, a control memory 1035, and a cache memory 1012.

Each of the functions is realized by executing a program defined for each of the functions by means of the CPU 1030 of the disk array control apparatus 1010.

Each of the functions is now described with reference to operation of the embodiment.

When the data dispersed pattern setting function 2010 receives a command for increasing the storage units from the operator, the function 2010 reads the information of the number of storage units included in the original system before increase of another storage unit, the redundancy of the system and an amount of data dispersed in one storage unit at a time stored previously in the control memory 1035 and determines a new data dispersed pattern on the basis of the number of storage units to be increased and the information read from the control memory 1035, so that information relative to the new data dispersion is stored in the control memory 1035.

The old data dispersed pattern is also stored in the control memory 1035 until the data rearrangement is completed.

Thereafter, the data rearrangement function 2020 is started.

The data rearrangement function 2020 reads data from the storage units 1021 to 1024 to the cache memory 1012 of the disk array control apparatus 1010 through the drive input/output control function 2090 in accordance with the old data dispersed pattern before the increase on the basis of the data dispersed pattern information in the control memory 1035.

The data rearrangement function 2020 requests the parity data preparing function 2030 to prepare the parity data. The parity data is prepared by an exclusive or of a plurality of data, for example.

The parity data preparing function 2030 prepares or generates the parity data in accordance with the new data dispersed pattern from the data read in the cache memory 1012 by means of the data rearrangement function 2020 newly. A write position on the way of the data rearrangement is stored and the new data dispersed pattern is determined on the basis of a comparison result of an access position from the control processor and the write position on the way of the data rearrangement. Accordingly, the data rearrangement is dynamically performed in response to a situation of increase of the storage unit.

The newly prepared parity data is stored in the cache memory 1012.

Thereafter, the data rearrangement function 2020 writes the transfer data from the control processor in the cache memory 1012 and the parity data prepared newly by the parity data preparing function into the storage units 1021 to 1025 through the drive input/output control function 2090 on the basis of the new data dispersed pattern set by the data dispersed pattern setting function 2010 to perform the data rearrangement.

Further, the data rearrangement function 2020 instructs the cache resident function 2060 to prohibit data on the way of the rearrangement process from being expelled or replaced from the cache memory 1012.

The data rearrangement function 2020 is stopped after completion of the data rearrangement of the old data dispersed pattern.

When an access request is issued from the control processor 1001 on the way of the data rearrangement, the data rearrangement function 2020 requests the access request receiving function 2070 to receive the access request from the control processor 1001 and also requests the drive input/output control function 2090 to execute the access request.

The drive input/output control function 2090 examines whether the data rearrangement is being processed or not on the basis of the information provided by the data dispersed pattern boundary management function 2050. When the data rearrangement is not being processed, the drive input/output control function 2090 selects any one of the new and old data dispersed patterns and performs the input/output process for the storage units 1021 to 1025.

In the area in which the data rearrangement is being performed, the data arrangement pattern in the drive including data to be accessed is not matched among the storage units 1021 to 1025 and accordingly when the storage units 1021 to 1025 are directly accessed, there is a case where wrong data is accessed.

Thus, the storage units 1021 to 1025 are prevented by the cache hitting function 2080 from being accessed on the way of the data rearrangement.

When there is a read/write request from the control processor 1001 to the data held in the cache memory 1012 by the cache resident function 2060, the cache hitting function 2080 performs only reading/writing of data with respect to the cache memory 1012 and does not directly access to the storage units 1021 to 1025.

When there is a writing request of data to the cache memory 1012 from the control processor 1001 on the way of the data rearrangement, the data written in the cache memory 1012 from the control processor 1001 on the way of the data rearrangement is written in corresponding storage units 1021 to 1025 after completion of the data rearrangement.

The data dispersed pattern boundary management function 2050 identifies a rearrangement unexecuted area, a rearrangement executed area and a rearrangement executing area with the progress of the data rearrangement performed by the data rearrangement function 2020 and gives information for judging which pattern of the new and old data dispersed patterns is used to perform the access by the input/output control.

Further, the data reconstitution function 2040 reconstitutes data to which access cannot be made by using the parity data when access cannot be directly made to the data in the storage unit due to a failure or the like.

Figure 6:
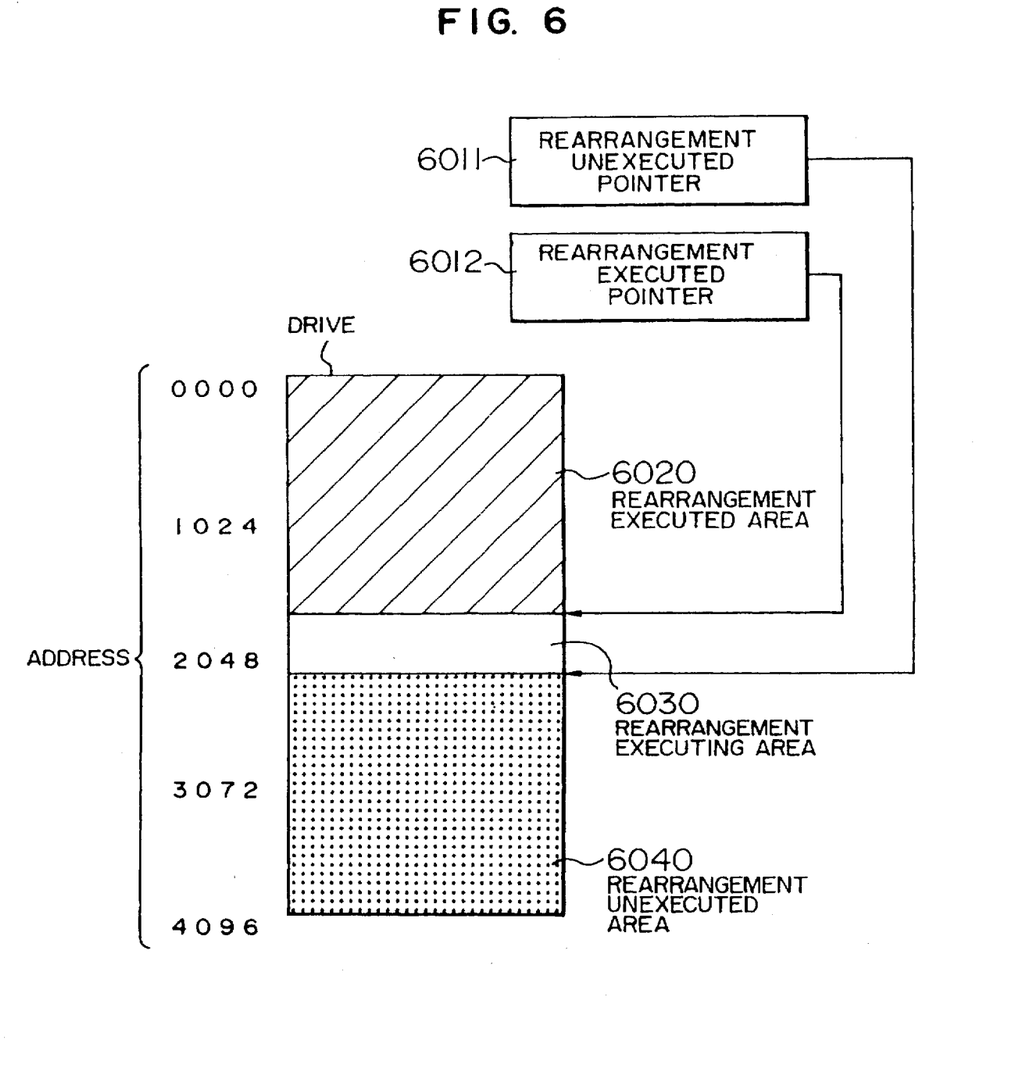
FIG. 6 is a diagram for explaining the data dispersed pattern boundary control upon the data rearrangement in the embodiment.

Referring now to FIG. 6, the data dispersed pattern boundary control due to the data rearrangement in the embodiment is described.

FIG. 6 is a diagram for explaining the data dispersed pattern boundary control due to the data rearrangement in the embodiment.

In FIG. 6, addresses represent logical addresses of data dispersed to be stored in the storage units and the conversion from a logical address of data to a physical address of the storage unit in which the data is stored is made on the basis of the mapping information in the same manner as in the prior art.

A rearrangement executed pointer 6012 represents the last address of the rearrangement executed area 6020 in which the rearrangement of data has been already completed and the data access can be made by the new data dispersed pattern after increase of the storage unit.

A rearrangement unexecuted pointer 6011 represents the head address of a rearrangement unexecuted area 6040 in which the rearrangement is not started yet and to which access can be made by the old data dispersed pattern before increase of the storage unit.

A rearrangement executing area 6030 between the rearrangement executed pointer 6012 and the rearrangement unexecuted pointer 6011 is an area in which the rearrangement is being executed and a data dispersed pattern is disturbed.

Accordingly, as described above, data in the cache memory 1012 is accessed instead of the rearrangement executing area.

The two pointers are stored in the control memory 1035.

Figure 3:
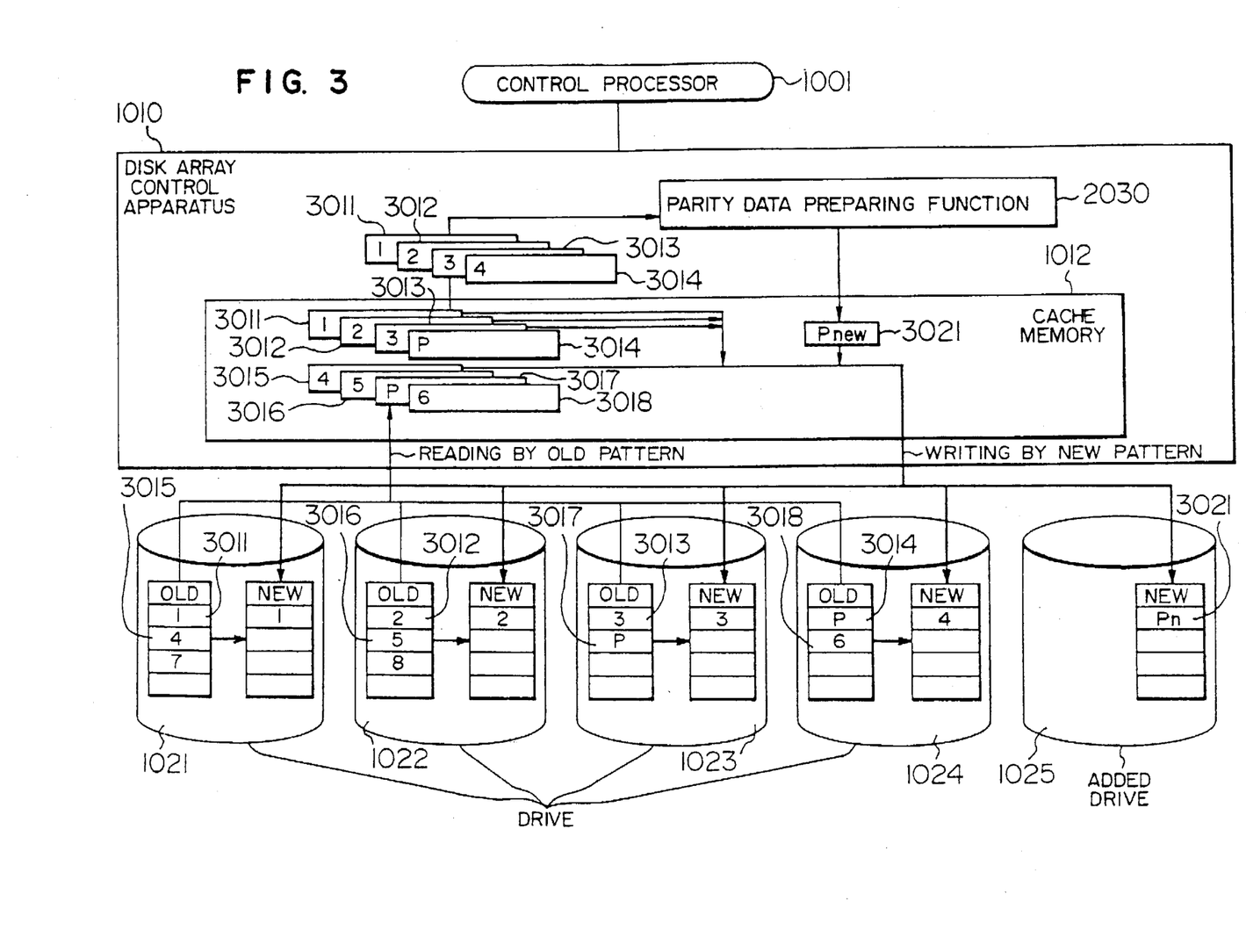
FIG. 3 is a diagram showing a flow of data in case where a drive unit is increased for the purpose of improvement of the data transfer speed in the embodiment.

Referring now to FIG. 3, increase of the drive unit 1025 for the purpose of the improvement of the data transfer speed is described in detail.

FIG. 3 is a diagram showing the data flow in the case where the drive unit 1025 for storing data is increased for the purpose of the improvement of the data transfer speed in the embodiment. In FIG. 3, one parity data is formed from four data by addition of the drive unit 1025 and the redundancy is left to be 1.

In order to improve the data transfer speed, the number of drives into which data are dispersed is increased and the number of drives to which data can be transferred in parallel is increased.

Since the data are not stored in the increased storage unit 1025, data already stored in the drive units 1021 to 1024 are rearranged into the drive units 1021 to 1025.

The data dispersed pattern setting function 2010 which has received an indication for increasing the drive unit from the operator sets the width for the data dispersion to 5 drives and the data dispersed pattern of the redundancy 1 and stores them in the control memory 1035.

Thereafter, control is moved to the data rearrangement function 2020.

Figure 5:
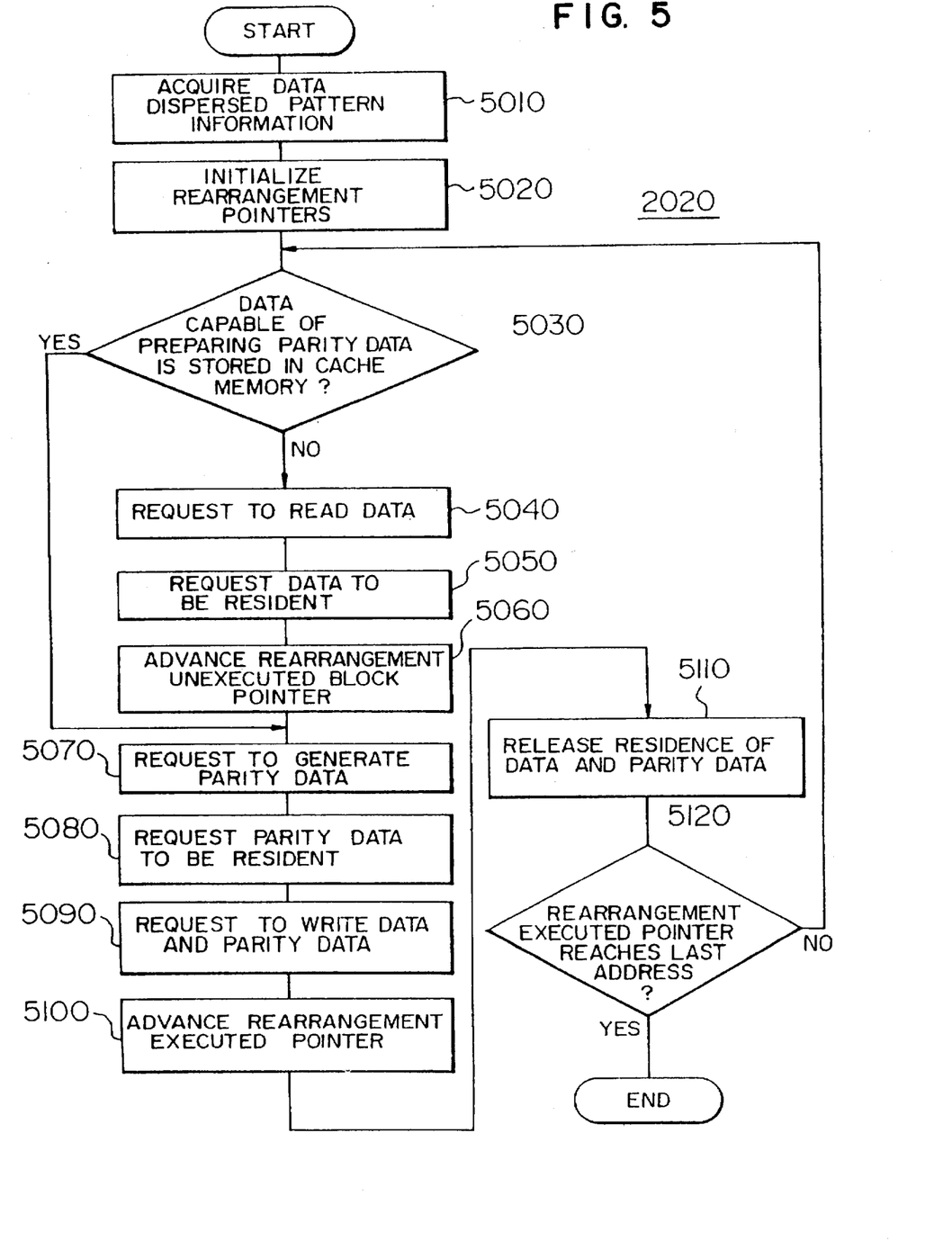
FIG. 5 is a flow chart showing the rearrangement process of the data rearrangement function in the embodiment.

Referring now to FIG. 3 showing the data flow and FIG. 5 showing a flow chart, the rearrangement process of the data rearrangement function 2020 is described.

FIG. 5 is a flow chart showing the rearrangement process of the data rearrangement function 2020 in the embodiment.

First of all, the data dispersed pattern setting function 2010 acquires the old and new data dispersed patterns stored in the control memory 1035 (step 5010).

The rearrangement unexecuted pointer 6011 and the rearrangement executed pointer 6012 are then set in the head address of the drive (step 5020).

Whether data for the rearrangement are read in the cache memory 1012 or not is examined on the basis of the rearrangement unexecuted pointer 6011 and the rearrangement executed pointer 6012 (step 5030).

In the embodiment, since the rearrangement of data is performed from the head address, the data for the rearrangement are not read in the cache memory 1012.

Thus, the drive input/output control function 2090 is requested to read out data 3011 to 3018 of two blocks continuing from an address indicated by the rearrangement unexecuted pointer 6011 of each of the drive units before increase into the cache memory 1012 on the basis of the old data dispersed pattern (step 5040).

The cache resident function 2060 is indicated to prohibit the read data 3011 to 3018 from being replaced (step 5050).

The rearrangement unexecuted pointer 6011 is advanced to the address of the data 3018 (step 5060).

The parity data preparing function 2030 is used to prepare a parity data 3021 newly from the four read data 3011 to 3013 and 3015 and the newly prepared parity data 3021 is stored in the cache memory 1012 (step 5070).

The cache resident function 2060 is indicated to prohibit the newly prepared parity data 3021 from being replaced (step 5080).

The drive input/output control function 2090 is requested to write the read data 3011 to 3013 and 3015 and the newly prepared parity data 3021 into the storage units 1021 to 1025 on the basis of the new data dispersed pattern set by the data dispersed pattern setting function 2010 (step 5090).

Then, after the completion of the writing in the step 5090, the rearrangement executed pointer 6012 is advanced to the address of the data 3015 (step 5100).

The cache resident function 2060 is indicated to release the prohibition of replacing the data 3011 to 3015 and the parity data 3021 (step 5110).

Further, in step 5030, when the parity data can be prepared from data (data 3016, 3018 and the like in FIG. 3), which are not rearranged and are left in the cache memory 1012, of the data read for the rearrangement, the process proceeds to step 5070 and the processes in step 5070 to 5110 are performed.

Whether the rearrangement executed pointer 6012 reaches the last address of the drive unit or not is judged (step 5120). When the rearrangement executed pointer 6012 reaches the last address of the drive unit, the rearrangement is completed and when the rearrangement executed pointer does not reach the last address of the drive unit, the above processes are repeated from step 5030.

Figure 4:
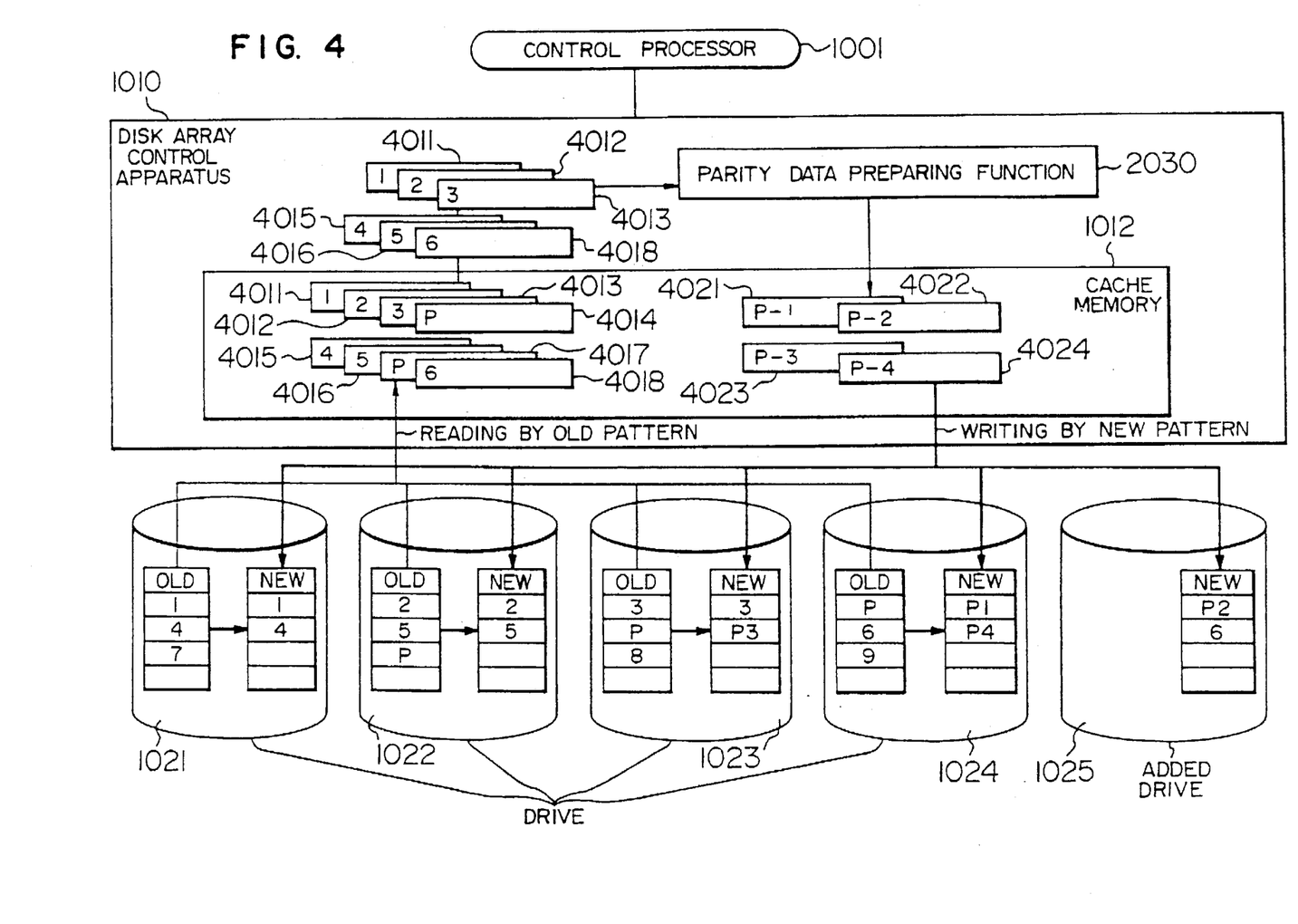
FIG. 4 is a diagram showing a flow of data in case where a drive unit is increased in order to increase the redundancy from 1 to 2.

Referring now to FIG. 4, increase of the drive unit 1025 for the purpose of increasing the redundancy from 1 to 2 is described in detail.

FIG. 4 is a diagram showing the data flow in case where the drive unit 1025 is increased for the purpose of increasing the redundancy from 1 to 2 in the embodiment. In FIG. 4, two parity data are formed from three data by addition of the drive unit 1025.

Since one drive unit 1025 is increased for the purpose of increasing the redundancy by 1, the number of drive units for storing data is not changed and the memory capacity of the system is not also changed.

However, in order to prevent concentration of accesses to a particular drive unit, the parity data including a newly prepared parity data are dispersed to be stored in a plurality of drive units 1021 to 1025 and accordingly the rearrangement of data is performed.

The data dispersed pattern setting function 2010 which has received the indication for increase of the drive unit sets the width for the data dispersion to 5 drives and the data dispersed pattern of the redundancy 2 and stores them in the control memory 1035.

Then, control is moved to the data rearrangement function 2020.

Referring now to FIG. 4 showing the data flow and FIG. 5 showing the flow chart, the rearrangement process of the data rearrangement function 2020 is described.

First of all, the data dispersed pattern setting function 2010 acquires the data dispersed pattern stored in the control memory 1035 (step 5010).

The rearrangement unexecuted pointer 6011 and the rearrangement executed pointer 6012 are set to the head address of the drive (step 5020).

Whether the data for the rearrangement is read in the cache memory 1012 or not is examined on the basis of the rearrangement unexecuted pointer 6011 (step 5030).

In this case, since the rearrangement of data is performed from the head address, the data for the rearrangement is not read in the cache memory 1012.

The drive input/output control function 2090 is requested to read out data 4011 to 4018 of two blocks continuing from the address indicated by the rearrangement unexecuted pointer 6011 of each of the drive units before increase into the cache memory 1012 on the basis of the old data dispersed pattern (step 5040).

The cache resident function 2060 is instructed to prohibit the read data 4011 to 4018 from being replaced (step 5050).

The rearrangement unexecuted pointer 6011 is advanced to the address for the data 4018 (step 5060).

The parity data preparing function 2030 is used to prepare parity data 4021 to 4024 newly from the six read data 4011 to 4013, 4015, 4016 and 4018 and the newly prepared parity data 4021 to 4024 are stored in the cache memory 1012 (step 5070). That is, parity data (P-1 and P-2) 4021 and 4022 are formed from the data 4011 to 4013 and parity data (P-3 and P-4) 4023 and 4024 are formed from the data 4015, 4016 and 4018.

The cache resident function 2060 is indicated to prohibit the newly prepared parity data 4021 to 4024 from being replaced (step 5080).

The drive input/output control function 2090 is requested to write the read data 4011 to 4013, 4015, 4016 and 4018 and the newly prepared parity data 4021 to 4024 into the storage units 1021 to 1025 on the basis of the new data dispersed pattern set by the data dispersed pattern setting function 2010 (step 5090).

Then, after the completion of the writing in the step 5090, the rearrangement executed pointer 6012 is advanced to the address of the data 4018 (step 5100).

The cache resident function 2060 is indicated to release the prohibition of replacing the data 4011 to 4018 and the parity data 4021 to 4024 (step 5110).

Further, in step 5030, when the parity data can be prepared from data (there is no pertinent data in FIG. 4), which is not rearranged and is left in the cache memory 1012, of the data read for the rearrangement, the process proceeds to step 5070 and the processes in step 5070 to 5110 are performed.

Whether the rearrangement executed pointer 6012 reaches the last address of the data or not is judged (step 5120). When the rearrangement executed pointer 6012 reaches the last address of the data, the rearrangement is completed and when the rearrangement executed pointer does not reach the last address of the data, the above processes are repeated from step 5030.

As described above, according to the present invention, when one drive unit 1025 is increased, the data dispersed pattern is prepared with respect to the data existing before the increase with the increased drive included and the rearrangement of data is performed, so that the increase of the storage unit can be attained for the purpose of the improvement of the data transfer speed or the improvement of the data reliability by increased redundancy.

Further, since the data including the parity data before the increase of the storage unit are read in the cache memory 1012 collectively, the number of times for input/output operations with respect to the drive units 1021 to 1025 due to the data rearrangement process can be reduced to shorten a time necessary for the rearrangement process.

In this case, the number of blocks of data read in the cache memory 1012 is at least only the number of blocks of data necessary for preparing the parity data newly due to the rearrangement of data.

Further, the parity data before the increase are read out in reading out with the data dispersed pattern before the increase when the drive unit 1025 is increased and accordingly when a part of data to be read out cannot be read out due to a failure of the whole or a part of the drive units 1021 to 1024, the data can be recovered by using the data in the cache memory 1013 without the need of input/output of new data.

In the embodiment, the parity data are also read out in reading out with the data dispersed pattern before the increase when the drive unit is increased even for the purpose of increasing the data storage capacity or the redundancy.

However, since the data read in the cache memory 1012 is sufficient if it is only the data necessary for preparing the new parity data due to the rearrangement of data, the parity data before the increase can be removed from the data read in the cache memory 1012.

However, when there is a closed storage unit in case where data except the parity data are read in the cache memory 1012 from the storage units 1021 to 1024 before the increase, it is necessary to read data from the normal storage unit of the storage units before the increase and reconstitute the data stored in the closed storage unit by using the parity data.

The present invention has been described definitely with reference to the embodiment, while it is needless to say that the present invention is not limited to the embodiment and can be modified variously within the scope in which the present invention does not depart from the gist thereof. For example, there is a method that when there are one or more, for example k (k>1) increased drive units, added parity data are assigned to s ($0 \leq s \leq k$) units and added data are assigned to the remaining (k-s) units. By using the method, the rearrangement of data can be changed dynamically in response to a situation of increase of the storage units.

As described above, according to the present invention, in the array type storage unit system, the control apparatus reads out a predetermined number of storage data from the plurality of storage units before the increase into the memory of the control apparatus and the parity data is newly prepared from the predetermined number of storage data read in the memory of the control apparatus in accordance with the redundancy of the storage unit system. The transfer data from the control processor read in the memory of the control apparatus and the newly prepared redundancy data are dispersed to be stored in the plurality of storage units after the increase to perform the rearrangement of data. Further, the write position on the way of the rearrangement of data is stored and the access position for the access request from the control processor is compared with the write position on the way of the rearrangement of data to determine the data dispersed pattern used in the data access from the control processor on the basis of the comparison result. Accordingly, the dynamic rearrangement of data can be attained and the storage unit can be increased with a unit of one storage unit instead of increase with a unit of a plurality of storage units in which data are dispersed and a cost for the increase of the storage capacity can be reduced.

Thus, the number of storage units in which the data are dispersed can be changed without stop of the system, so that the data transfer speed can be improved by increase of the storage unit.

Further, the data are rearranged dynamically, so that the redundancy can be increased by addition of the storage unit and the reliability of data can be improved.

What is claim is:

1. An array type storage unit system comprising:

a plurality of storage units for storing parity groups each of which includes a plurality of data blocks and a parity data block; and a control apparatus connected between a processor and said plurality of storage units, said control apparatus having:

a cache memory;

rearrangement means for deciding an arrangement of data blocks on said plurality of storage units on the basis of redundancy of the storage unit system in response to addition of a new storage unit to said plurality of storage units;

reading means for reading data blocks from said plurality of storage units to said cache memory after addition of the new storage unit;

writing means for writing the data blocks from said cache memory into said plurality of storage units including said new storage unit based on the arrangement of data blocks decided by said rearrangement means;

write position storing means for storing write position information that indicates an extent of data blocks that are being processed by said reading means and said writing means;

means for comparing an access position of a request for data access from said processor with the write position information; and means for determining a data dispersed pattern for the data access requested by said processor on the basis of a comparison result of said comparing means.

2. An array type storage unit as claimed in claim 1, wherein the control apparatus further includes:

composing means for composing a data block set from the data blocks read from said plurality of storage units based on the arrangement of data blocks decided by said rearrangement means in order to form a new parity group;

preparing means for generating a new parity data block corresponding to said data block set, and for forming a new parity group that includes data blocks in said data block set and said new parity data block; and writing means for writing said parity data block of said new parity group into said plurality of storage units including said new storage unit.

3. An array type storage unit system as claimed in claim 1, wherein the addition of a new storage unit to the plurality of storage units increases thereby the total number of said storage units operating in said array type storage system.

4. An array type storage unit system as claimed in claim 2, wherein the addition of a new storage unit to the plurality of storage units increases thereby the total number of said storage units operating in said array type storage system.

* * * * *